United States Patent
Yu et al.

(10) Patent No.: US 9,108,859 B2
(45) Date of Patent: *Aug. 18, 2015

(54) ENGINEERED PROCESS OF MANUFACTURING CALCIUM ALUMINATE CARBONATES FOR MEDIUM-HIGH TEMPERATURE $CO_2$ CAPTURE

(75) Inventors: Ching-Tsung Yu, Taoyuan County (TW); Yau-Pin Chyou, Taipei (TW); Wei-Chin Chen, Miaoli County (TW); Wun-Syong Chen, Taoyuan County (TW)

(73) Assignee: INSTITUTE OF NUCLEAR ENERGY RESEARCH, ATOMIC ENERGY COUNCIL, Lungtan, Taoyuan (TW)

( * ) Notice: Subject to any disclaimer, the term of this patent is extended or adjusted under 35 U.S.C. 154(b) by 275 days.

This patent is subject to a terminal disclaimer.

(21) Appl. No.: 13/613,224

(22) Filed: Sep. 13, 2012

(65) Prior Publication Data

US 2014/0072501 A1    Mar. 13, 2014

(51) Int. Cl.
| | |
|---|---|
| *C01F 11/00* | (2006.01) |
| *B01J 20/04* | (2006.01) |
| *B01D 53/14* | (2006.01) |
| *C01F 7/00* | (2006.01) |

(52) U.S. Cl.
CPC ............ *C01F 11/00* (2013.01); *B01D 53/1475* (2013.01); *B01J 20/041* (2013.01); *C01F 7/002* (2013.01); *C01P 2002/22* (2013.01); *C01P 2002/72* (2013.01); *C01P 2002/88* (2013.01); *C01P 2004/03* (2013.01); *C01P 2004/04* (2013.01); *C01P 2004/60* (2013.01); *C01P 2004/61* (2013.01); *C01P 2006/12* (2013.01); *C01P 2006/14* (2013.01); *C01P 2006/16* (2013.01); *C01P 2006/37* (2013.01)

(58) Field of Classification Search
CPC ............. B01D 53/02; B01D 2251/404; B01D 2253/304; B01D 2253/34; B01D 2257/04; C01B 31/24; B01J 20/042; Y02C 10/08
USPC ............. 423/419.1, 430, 431, 420.2; 502/401
See application file for complete search history.

(56) References Cited

U.S. PATENT DOCUMENTS

| | | | | |
|---|---|---|---|---|
| 4,133,755 | A * | 1/1979 | Tarao et al. | 210/679 |
| 5,462,813 | A * | 10/1995 | Nagano et al. | 428/698 |
| 2010/0248956 | A1 * | 9/2010 | Yu et al. | 502/414 |
| 2013/0015399 | A1 * | 1/2013 | Yu et al. | 252/184 |

\* cited by examiner

*Primary Examiner* — Richard M Rump
(74) *Attorney, Agent, or Firm* — Jackson IPG PLLC; Demian K. Jackson

(57) ABSTRACT

An engineered process of manufacturing a carbon capturing agent calcium aluminum carbonate Ca—Al—$CO_3$ includes steps of mixing, solid-liquid separation, drying and extrusion, crushing and conveying, and calcined molding. The acid bath of $Ca^{+2}$ and $Al^{+3}$ is mixed with the alkaline bath of $Na_2CO_3$ and NaOH while stirring to form slurry which are then subject to solid-liquid separation to obtain a filtrated cake. The filtrated cake is place into a drying and extrusion device to obtain granular material. The granular material is placed in a conveying and crushing equipment to obtain a powder material. The powder material is calcined at furnace for forming a Ca—Al—$CO_3$, which is nano-layered composite with high porosity. Thereby, the preparation of a solid sorbent can be scale up under systematically controlled with yield of at least batches of kilograms used in medium-high temperature (400~800° C.) $CO_2$ capture.

9 Claims, 11 Drawing Sheets

| | |
|---|---|
| Ca:Al ratios | 1:1 - 30:1 |
| Particle size distribution of the powder (μm) | 80°C:10-50 μm; 30°C:100-200 μm |
| surface area ($m^2/g$) | 10.0 - 40.0 |
| pore volume ($cm^3/g$) | 0.02 - 0.20 |
| pore diameter (nm) | 21.0 - 40.0 |
| CaO (wt%) | 40.0 - 80.0 |

Fig. 5

| Ca:Al ratios | Initial $CO_2$ sorption capacity (wt%) | TGA test conditions |
|:---:|:---:|:---:|
| 1:1 | 10.0 | |
| 5:1 | 48.5 | 750°C |
| 7:1 | 53.2 | 100%, 50 cc/min |
| 13:1 | 63.2 | $CO_2$ |
| 20:1 | 64.5 | |
| 30:1 | 65.3 | |

Fig.7

ENGINEERED PROCESS OF MANUFACTURING CALCIUM ALUMINATE CARBONATES FOR MEDIUM-HIGH TEMPERATURE $CO_2$ CAPTURE

BACKGROUND OF THE INVENTION

1. Field of the Invention

The present invention relates to an engineered process for manufacturing a $CO_2$ capturing sorbent of calcium aluminum carbonate Ca—Al—$CO_3$, and particularly to a process of manufacturing a carbon capturing agent which is obtained in batches of at least kilograms scale by controlling systematic experimental parameters. As fabricating material Ca—Al—$CO_3$ is used to capture carbon dioxide at medium-high temperature (400~800° C.) conditions.

2. Description of Related Art

It is a promising goal for international society to reach carbon dioxide reduction by carbon dioxide ($CO_2$) capturing technology. The carbon capturing technology can be widely used in elevated temperature procedures relating to $CO_2$ emissions in the industry, such as burning of coal and oil or gas adsorption enhanced reforming (AER), etc. From international experiences, it shows that the currently developing carbon capturing technologies are post-combustion process, which applies amine-based solvent such as ethanol amine at about 100 to 150° C. condition. The carbon capturing technology based on alkaline solvents have shortcomings of low carbon capturing amount, high energy consumption, corrosion to facility and unfriendliness to environment. In addition, a narrow capturing temperature range is also an important concern. As a great effort of the world adopting various technologies to slow down the $CO_2$-related greenhouse effect, the extensive development of $CO_2$ capture technology at different industries should prospectively become a trend, given an example of solid sorbent announced as the emerging technology in the upcoming 10 years by U.S. Department of Energy.

The solid sorbents have significant merits of a wide range of work temperatures from room temperature to 800° C., convenient for use and handling, and friendliness to environment. The $CO_2$ capture capacity mainly depends on the temperature and the used material, affecting on its performance (Energy Environ. Sci., 2011, 4, 3805-3819). There are three categories: (1) at low temperature (<200° C.) such as carbon materials, zeolite, amine modified metal organic frames (MOFs), and alkali metal carbonate etc, with carbon capturing amount of 3.5-9.4 mmol/g;. (2) at medium temperature (200-400° C.), such as Mg—Al layered compounds (LDHs), K modified LDHs etc, with the carbon capturing amount of about 1.4 mmol/g; and (3) at medium-high temperature (>400° C.), such as CaO-containing alkaline ceramics, with the carbon capturing amount of 6.5-11.6 mmol/g.

Different $CO_2$ sorbents exhibit wide application ranges. Basically, physical adsorption is occurred at low-temperature, and therefore has poor gas selectivity. To increase carbon capturing capacity, structural materials with high surface area such as of MCM-41, SBA-15 and MOF can be used as support. Thus, by incorporating alkaline groups and carriers, both of $CO_2$ selectivity and capacity are improved. Lee (R.O.C. application No. 098107986) discloses the use of an amine-modified silicon substrate (MSPs) at 20-150° C. with maximum adsorption capacity of 102 mg/g (2.32 mmol/g). In addition, MgO-based sorbent are mainly used at medium temperature, a better $CO_2$ sorption performance is usually achieved via modification. Hazard (J. Hazard Mater., 2012, 203, 341-347) discloses a mesoporous substrate modified by MgO, which reach the maximum adsorption amount of 131 mg/g (2.98 mmol/g) at 150-400° C.

The requirements of better carbon capturing agent at high temperatures must have a high carbon capturing amount, rapid rate, good stability and mechanical strength etc. To capture $CO_2$ under medium-high temperature has advantages of wide $CO_2$ concentrations, high capture amount and reasonable energy consumption and therefore is regarded as a very promising technology. Such a series of materials containing calcium oxide (CaO) have been most extensively studied with $CO_2$ capture process including carbonation and regeneration steps.

However, the major technological bottleneck for elevated temperature $CO_2$ capture is the improvement of high temperature stability of sorbent. As we known, CaO-based sorbents tend to deteriorate at high temperature and in high $CO_2$ concentration. How to maintain the stability in high $CO_2$ concentration and temperature is the key issue. Therefore, it is presently explored on post-combustion capture activity for majority of the researches and patents. For example: U.S. Patent Application No. 20120025134A1 discloses the synthesis of CaO/MgO series materials with conversion rate of higher than 90% for 600 min (15% $CO_2$) at 800-900° C. R.O.C. Patent Application No. 099 116 724 discloses the use of CaO and other metal oxides in the carbon dioxide capturing system to obtain 99-100% $CO_2$ removal rate (13-16% $CO_2$) at 650° C. The above technology has improved $CO_2$ capturing weight evenly at elevated temperature but of less than 16% $CO_2$. Furthermore, most of them cannot afford sorbent production with kilo-scale, lacking the cost competition.

The present invention intends to use the co-precipitation method to manufacture the carbon capturing agent in yield of at least kilograms per batch. This sorbent is hydrophilic material with a lamella structure formed by $Ca^{+2}$, $Al^{+3}$, $OH^-$ and $CO_3^{2-}$. After calcinations for removal layered ions, a mixed oxide with high CaO content is obtained. This sorbent exhibit a promising niche as applied to medium-high temperature of 400-800° C. under a wide concentration range of 5-100% $CO_2$.

In order to solve the aforementioned problems, the inventors has studied and proceeded in-depth discussion, and actively seek approaches for many years engaged in the research and experiences of related industries and manufacturing. After long-term research and efforts in development, the inventors has finally the successfully accomplished this invention "an engineered process of manufacturing a calcium aluminum carbonate Ca—Al—$CO_3$ as carbon capturing agent used at medium-high temperature" so as to improve the problem encountered in the prior art.

SUMMARY OF THE INVENTION

A main purpose of this invention is to provide an engineered process of manufacturing a $CO_2$ capturing sorbent of calcium aluminum carbonate Ca—Al—$CO_3$, which is obtained by systematic experimental parameters in bathes of kilograms. The sorbent can afford capturing carbon dioxide at medium-high temperature (400~800° C.).

In order to achieve the above and other objective, an engineered process of manufacturing calcium aluminum carbonate Ca—Al—$CO_3$ as carbon capturing agent according to the invention includes the following steps:

mixing: preparing an acid bath of a calcium ion source and a solution of aluminum nitrate $Al(NO_3)_3$, and alkaline bath of sodium carbonate ($Na_2CO_3$) and a solution of sodium hydroxide (NaOH);

solid-liquid separation: mixing the acid bath with the alkaline bath while stirring to form precipitates which are then subject to solid-liquid separation to obtain a filtrated cake;

drying and extrusion: placing the filtrated cake into a drying and extrusion device to obtain granular material;

crushing and conveying: placing the granular material in a conveying and crushing equipment to obtain a powder material; and calcined molding: placing the powder material into a high-temperature furnace for calcining, wherein during the calcination, interlayer anions and acetate are removed to form a carbon capturing agent calcium aluminum carbonate (Ca—Al—$CO_3$) of nano-layered composite with high porosity.

In one embodiment of the invention, at the step of mixing the calcium ion source is calcium acetate $Ca(CH_3COO)_2 \cdot xH_2O$, calcium nitrate $Ca(NO_3)_2$ or calcium chloride $CaCl_2$.

In one embodiment of the invention, at the step of mixing, the molar ratio of calcium source and aluminum nitrate $Al(NO_3)_3$ ranges from 1:1 to 30:1.

In one embodiment of the invention, using calcined sorbent; carbon dioxide can be captured at the medium-high temperature from 400 to 800° C., with initial captured carbon capacity of 10-65 wt %.

In one embodiment of the invention, using calcined sorbent; carbon dioxide is of 5-100% in concentration.

In one embodiment of the invention, using calcined sorbent; the stability is of up to 90-95% even after 40-100 cycles (60-150 hours).

BRIEF DESCRIPTION OF THE DRAWINGS

FIG. 5 shows basic natures of a carbon capturing agent after synthesis in different proportions Ca: Al=1~30:1 according to one embodiment of the invention.

FIG. 7 is a diagram of the initial carbon sorption capacity of $CO_2$ sorbents with different proportions of Ca: Al=30:1 according to one embodiment of the invention.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended tables.

Figure 1:
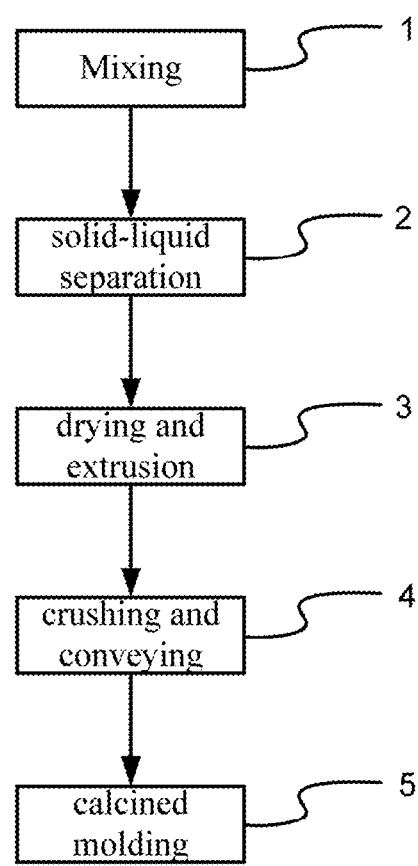
FIG. 1 is a schematic view of a process of manufacturing a carbon capturing agent calcium aluminum carbonate Ca—Al—$CO_3$ according to the invention.

FIG. 1 is a schematic view of a process of manufacturing a carbon capturing agent calcium aluminum carbonate Ca—Al—$CO_3$ according to the invention. As shown, the present invention is an engineered process of manufacturing a carbon capturing agent calcium aluminum carbonate Ca—Al—$CO_3$, at least including the following steps:

Step 1 of mixing: preparing an acid bath of a calcium ion source and a solution of aluminum nitrate $Al(NO_3)_3$, and alkaline bath of sodium carbonate ($Na_2CO_3$) and a solution of sodium hydroxide (NaOH). The calcium ion source is calcium acetate $Ca(CH_3COO)_2 \cdot xH_2O$, calcium nitrate $Ca(NO_3)_2$ or calcium chloride $CaCl_2$. The molar ratio of calcium source and aluminum nitrate $Al(NO_3)_3$ ranges from 1:1 to 30:1.

Step 2 of solid-liquid separation: mixing the acid bath with the alkaline bath while stirring to form precipitates which are then subject to solid-liquid separation to obtain a filtrated cake.

Step 3 of drying and extrusion: placing the filtrated cake into a drying and extrusion device to obtain granular material.

Step 4 of crushing and conveying: placing the granular material in a conveying and crushing equipment to obtain a powder material.

Step 5 of calcined molding: placing the powder material into a high-temperature furnace for calcining. During the calcination, interlayer anions and acetate are removed to form a carbon capturing agent calcium aluminum carbonate (Ca—Al—$CO_3$) of nano-layered composite with high porosity. At this step, carbon dioxide can be captured at the medium-high temperature from 400 to 800° C., with initial captured carbon capacity of 10-65 wt %. Therefore it can be applied to $CO_2$ concentration of 5-100%, with stability of up to at least 90-95% after 40-100 cycles (60-150 hours).

The carbon capturing agent uses different calcium sources, aluminum nitrate ($Al(NO_3)_3$) and sodium carbonate ($Na_2CO_3$) as reactants, and controls the alkaline by adding sodium hydroxide (NaOH), so as to produce layered materials with different ratios of calcium/aluminum. A lamella calcium/aluminum carbonate with structure of anions-containing layered double hydroxides (LDHs), which exhibit two metallic cations of calcium ($Ca^{+2}$) and aluminum ($Al^{+3}$) to form a layer of oxide octahedron. The layered structure constructed by carbonate ($CO_3^{2-}$) and hydroxyl ($OH^-$) is considered as a template for synthetic sorbent of Ca—Al—$CO_3$, due to the interlayer anions and acetate are removed in the calcination so as to provide the layered double oxides (LDOs) with nano composite and better porosity. Using calcium aluminum carbonate has the initial carbon capturing capacity of higher than 50 wt % (g$CO_2$/g sorbent), and still reaches the conversion rate of 90% even after carbon sorption/desorption multicyclic tests. The present invention accomplish an engineered process combination for fabricating sorbent with kilogramscale per batch, it is breakthrough over synthesis yield in lab and announce prospective potential for large-scale capturing or separating carbon dioxide at medium-high temperature.

Figure 2:
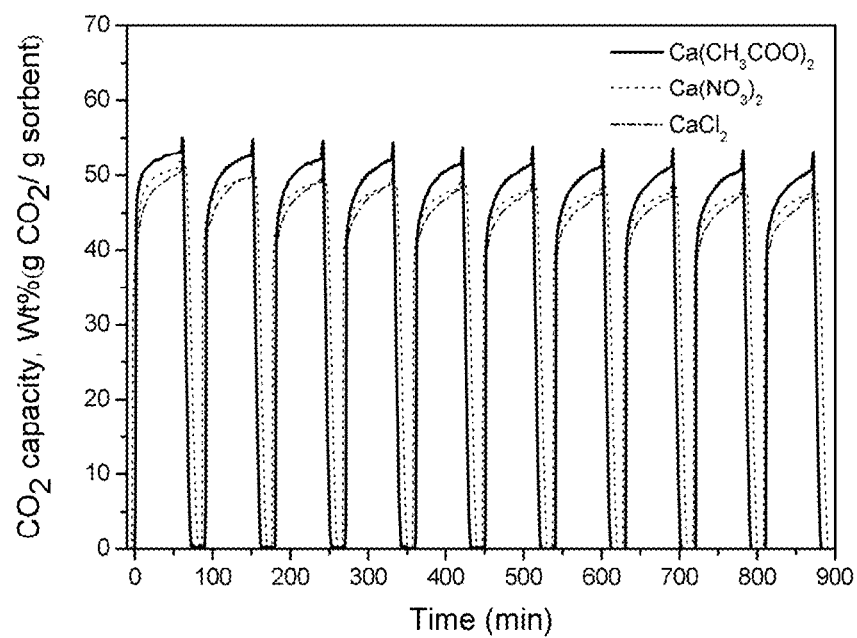
FIG. 2 is a diagram of carbon absorption of carbon capturing agent using one of precursors $Ca(CH_3COO)_2$, $CaCl_2$ or $Ca(NO_3)_2$ after 10 cycles by TGA test according to one embodiment of the invention.

The manufacturing method of the invention is applicable to the different calcium sources. For example, as shown in FIG. 2, taking advantage of the method and device of the present invention to manufacture the Ca—Al—$CO_3$ with Ca: Al=7:1 by using $Ca^{+2}$ source selected from $Ca(CH_3COO)_2$, $CaCl_2$, or $Ca(NO_3)_2$ etc, $CO_2$ capture experiments of 10 cycles are carried out in a thermogravimetric analyzer (TGA). The results show that the stability of the three kinds of materials is greater than 90%. Among these materials, the sorbent deriver from calcium acetate $Ca(CH_3COO)_2$ source shows better results in term of carbon capturing amount and stability. The present invention is intended to illustrate features and performance of the synthesis of the $CO_2$ capturing agent by using calcium acetate as precursor.

Figure 3:
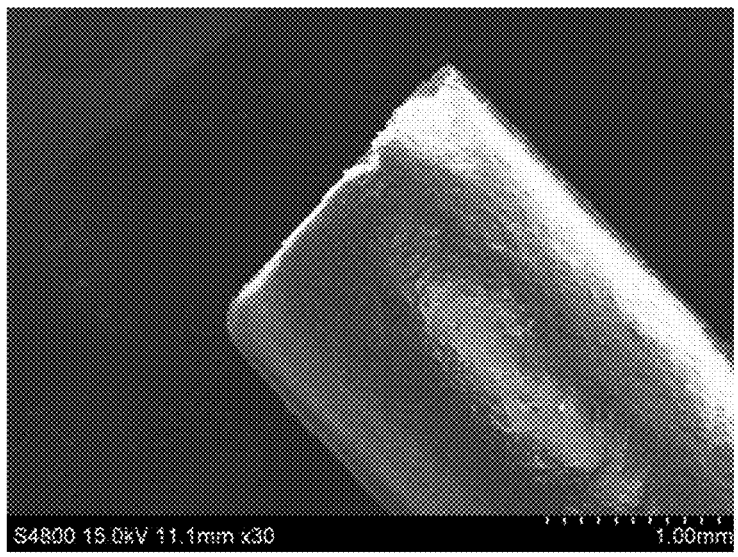
FIG. 3 is a SEM diagram of surfaces of carbon capturing agent with granules (top) and powers (bottom) according to one embodiment of the invention.
Figure 3:
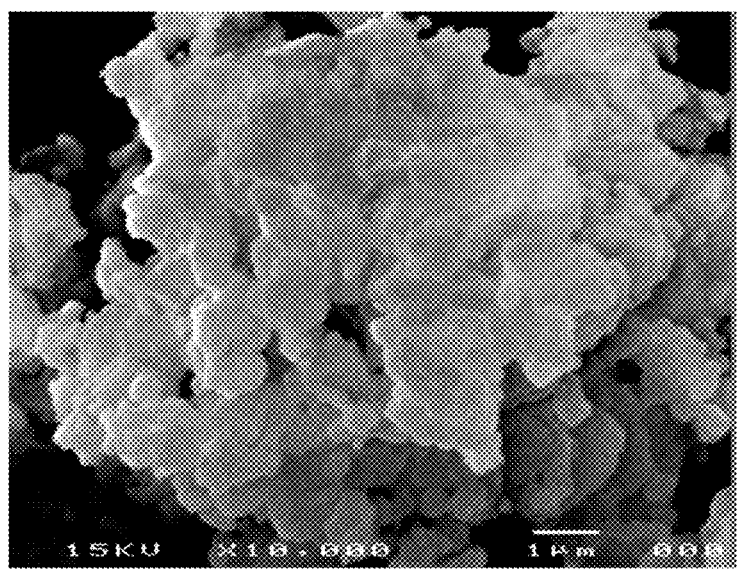

FIG. 3 shows a SEM diagram of carbon capturing agent with granules (top) and powders (bottom) form according to one embodiment of the invention. The granules have the size of 2-3mm in diameter and 3-5 mm in length and of cylindrical shape. The powders display morphological approximately sheet shape, which are distributed with aggregate size of about 100-200 um. The present invention can manufacture carbon capturing agents with both of the powder and granule at the same time, providing sorbent for a fixed-bed or fluidized-bed $CO_2$ capture reactors.

Figure 4:
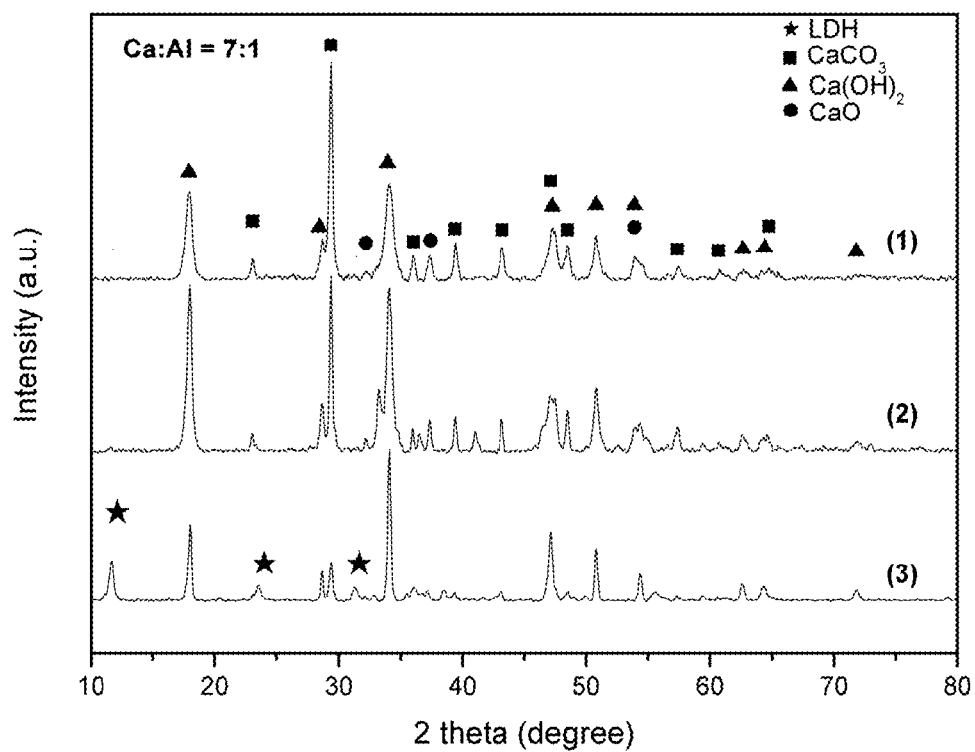
FIG. 4 is a XRD diagram of a carbon capturing agent with Ca: Al=7:1 uncalcined and calcined at 600° C. according to one embodiment of the present invention.

FIG. 4 is a XRD diagram of a carbon capturing agent with Ca: Al=7:1 uncalcined and calcined at 600° C. according to one embodiment of the present invention. This shows the main concept of the present invention that uses template with $Ca^{+2}$ and $Al^{+3}$ forming a layer oxide of octahedron, and constructs the interlayer structure by carbonate ($CO_3^{2-}$) and hydroxyl (OH). The obtained layered double hydroxides (LDHs) is characterized in that a diffraction peak (★) of uncalcined sample in the spectrum, which indicates the existence of calcium aluminum hydroxide carbonate hydrate (01-087-0493). Interlayer anions and acetic acid groups are removed from this structure after calcined at 600° C. to increase the porosity and form layered double oxides (LDOs) of Ca—Al—$CO_3$ mainly containing $Ca(OH)_2$, $CaCO_3$ and CaO.

FIG. 5 shows basic natures of Ca—Al—$CO_3$ powder with proportions of Ca: Al=1:1~30:1 according to one embodiment of the invention. By adjusting synthetic temperature, particle size of the powders can be controlled in the range of 10-200 um. This material has the mesoporous feature, including surface area of 10.0-40.0 $m^2/g$, pore volume of 0.02-0.20 $m^2/g$ and pore diameter of 21.0-40.0 nm. CaO content is calculated by acid digestion of sorbent and followed by determining Ca element content using inductively coupled plasma (ICP) spectrometry. CaO concentration increase with the higher Ca: Al ratio, indicating of 40-80 wt % of that for Ca: Al=1:1—30:1.

Figure 6:
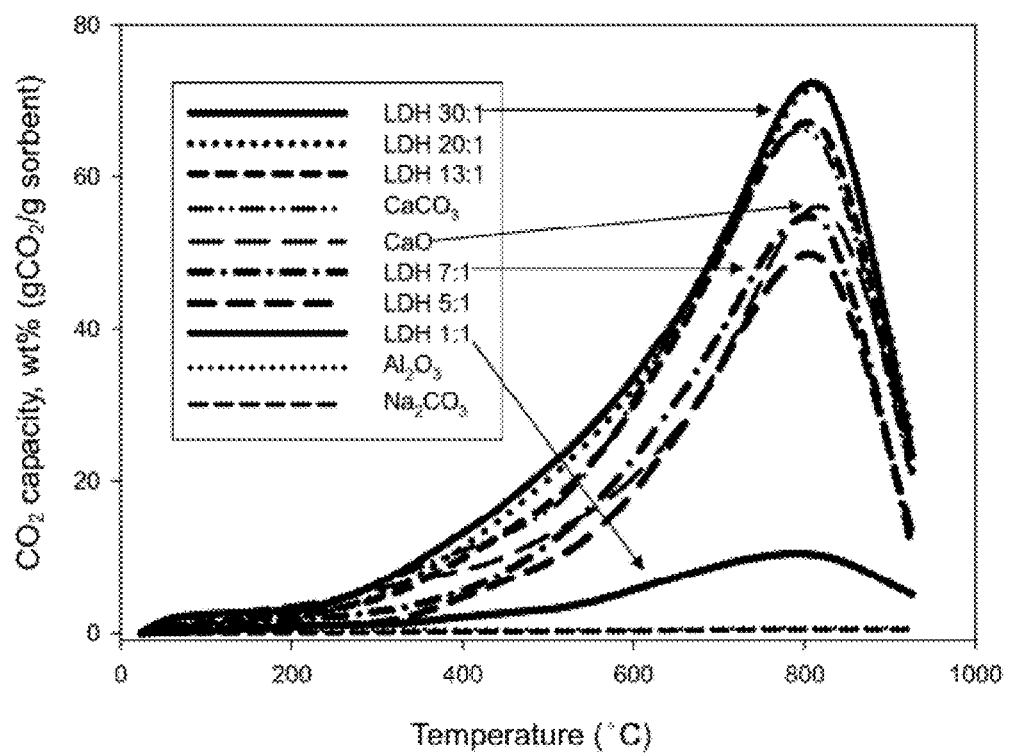
FIG. 6 is a diagram of the adsorption/desorption of $CO_2$ varying with temperature from room temperature to 950° C. via $CO_2$ sorbents with different proportions of Ca: Al=30:1 and related materials by TGA test according to one embodiment of the invention.

A thermal gravimetric analysis (TGA) is used to test the performance of sorbent. The capturing amount wt % (g $CO_2$/g sorbent) means that gained weight of sorbent due to adsorbing $CO_2$ at different temperatures. FIG. 6 illustrates the amount of $CO_2$ absorbed by prepared sorbents with Ca: Al=1—30:1 and related carbon capturing agents from room temperature to 950° C. The results show that CaO-based sorbents including Ca—Al—$CO_3$, CaO and $CaCO_3$ can be used to capture $CO_2$ at temperature higher than 400 to 800° C. at 100% and 50 cc $CO_2$/min. For Ca—Al—$CO_3$, carbon capturing amount increase with higher Ca: Al ratio. At constant temperature of 750° C., the initial sorption weight of Ca—Al—$CO_3$ (Ca: Al=30:1 and Ca: Al=7:1) is approximately equal to that for $CaCO_3$ and CaO, respectively. $Al_2O_3$ and $Na_2CO_3$ do not show any significant adsorption performance in this temperature range.

The initial carbon capturing amount of the Ca—Al—$CO_3$ series carbon capturing agent at constant 750° C. according to the present invention will increase as the Ca-to-Al ratio increases. When Ca: Al=1~30:1, the carbon capturing amount is up to 10-71 wt %., as shown in FIG. 7.

Figure 8:
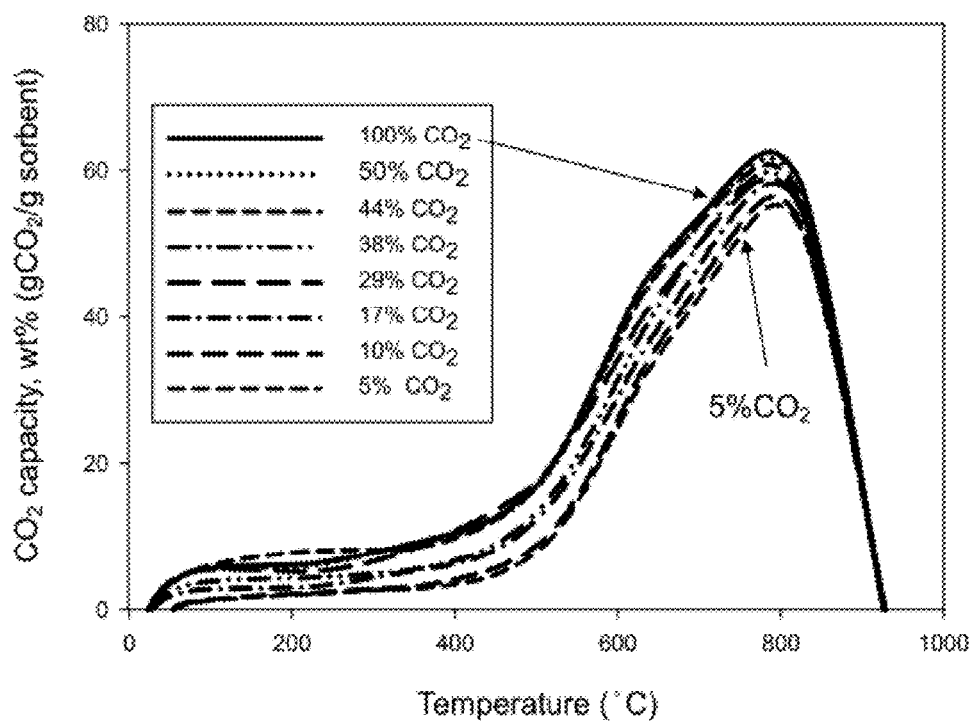
FIG. 8 shows the adsorption/desorption of $CO_2$ varying with temperature by TGA test upon 5-100% $CO_2$ at room temperature to 950° C. for the $CO_2$ sorbents with proportions of Ca: Al=7:1 according to one embodiment of the invention.

Another important performance for the carbon capturing agent is capable to apply to a wide range of $CO_2$ concentration for different industrial capturing processes. U.S. National Energy Technology Laboratory (NETL) lists two kinds of commonly used $CO_2$ capturing technologies: 5-15% $CO_2$ in post combustion, and 10-50% $CO_2$ in pre-combustion conditions. Please referring to FIG. 8, which shows the adsorption/desorption of $CO_2$ varying with temperature by TGA test at room temperature to 950° C. for the carbon capturing agent of Ca: Al=7:1. At the temperature of above 600° C., a significant adsorption performance can be observed. The carbon capturing amounts are respectively, expressed in wt %, 50.32% 51.41%, 51.5%, 53.63%, 54.26%, 55.97%, 56.26%, and 56.88% when the $CO_2$ concentrations (v/v) are respectively 5%, 10%, 17%, 29%, 38%, 44%, 50% and 100% at 750° C. These results indicate that the carbon capturing agent of the present invention can be used for a range of 5-100% $CO_2$ concentration.

Figure 9:
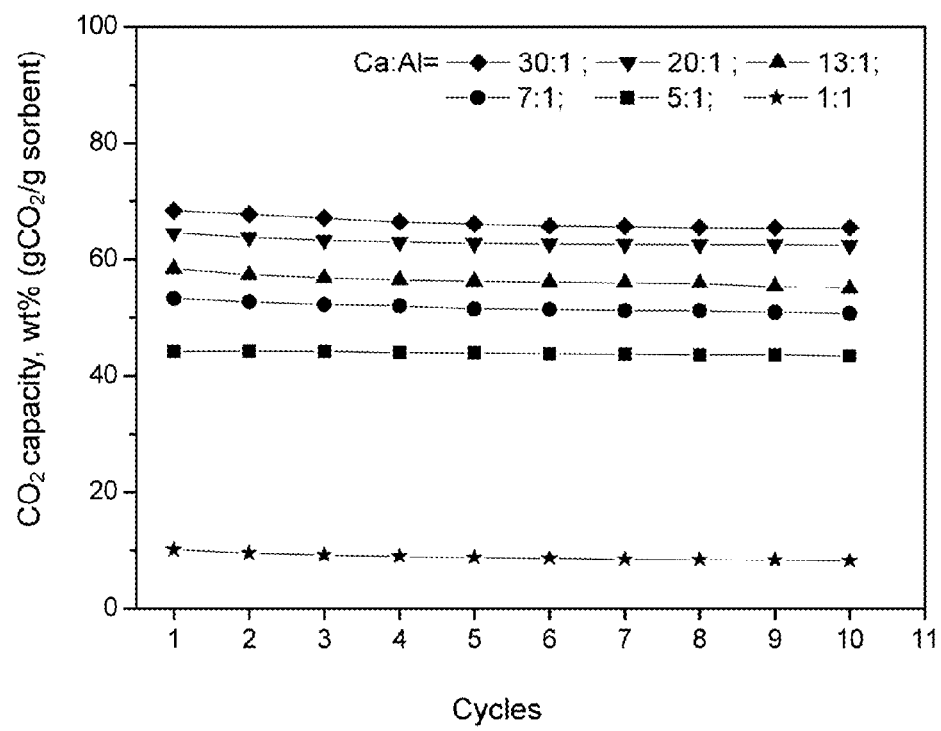
FIG. 9 shows the carbon capturing amount of the carbon capturing agents of Ca:Al=1:5, 1:7, 1:13, 1:20 and 1:30 at 750° C. by TG test upon adsorption/desorption of $CO_2$ for 10 cycles according to one embodiment of the invention.

When applied, the carbon capturing agent can be operated at the medium-high temperature from 400 to 800° C. The capturing amount wt % (g $CO_2$/g sorbent) means that gained weight of sorbent due to adsorbing $CO_2$ at different temperatures. At the adsorption process, reaction of absorbed $CO_2$ and CaO form $CaCO_3$. Desorption of $CO_2$ from Ca—Al—$CO_3$ indicates regeneration of spent sorbent that recovering available sites for next $CO_2$ adsorption. The single-route reaction comprises adsorption and desorption steps is as follows:

(Adsorption capturing for one hour) $CaO + CO_2 \rightarrow CaCO_3$ (Desorption renewing for 0.5 hours) $CaCO_3 \rightarrow CaO + CO_2$ This single route to capture carbon (1 Cycle=1.5 hours) includes the above adsorption and desorption steps. The stability is a ratio of $CO_2$ sorption weight at i cycles with respective to the weigh at i-1 cycles. FIG. 9 shows $CO_2$ capacity variation with cycles using Ca—Al—$CO_3$ with proportions of Ca: Al=30:1 at constant temperature of 750° C. The initial sorption weight increases with Ca/Al ratios, resulting in capacity of about 10-70 wt % for Ca: Al=1-30. Even after 10 carbon capturing cycles (15 hours), the stability of the sorbents is still as high as 90%, showing high carbon capturing performance in this range.

Figure 10:
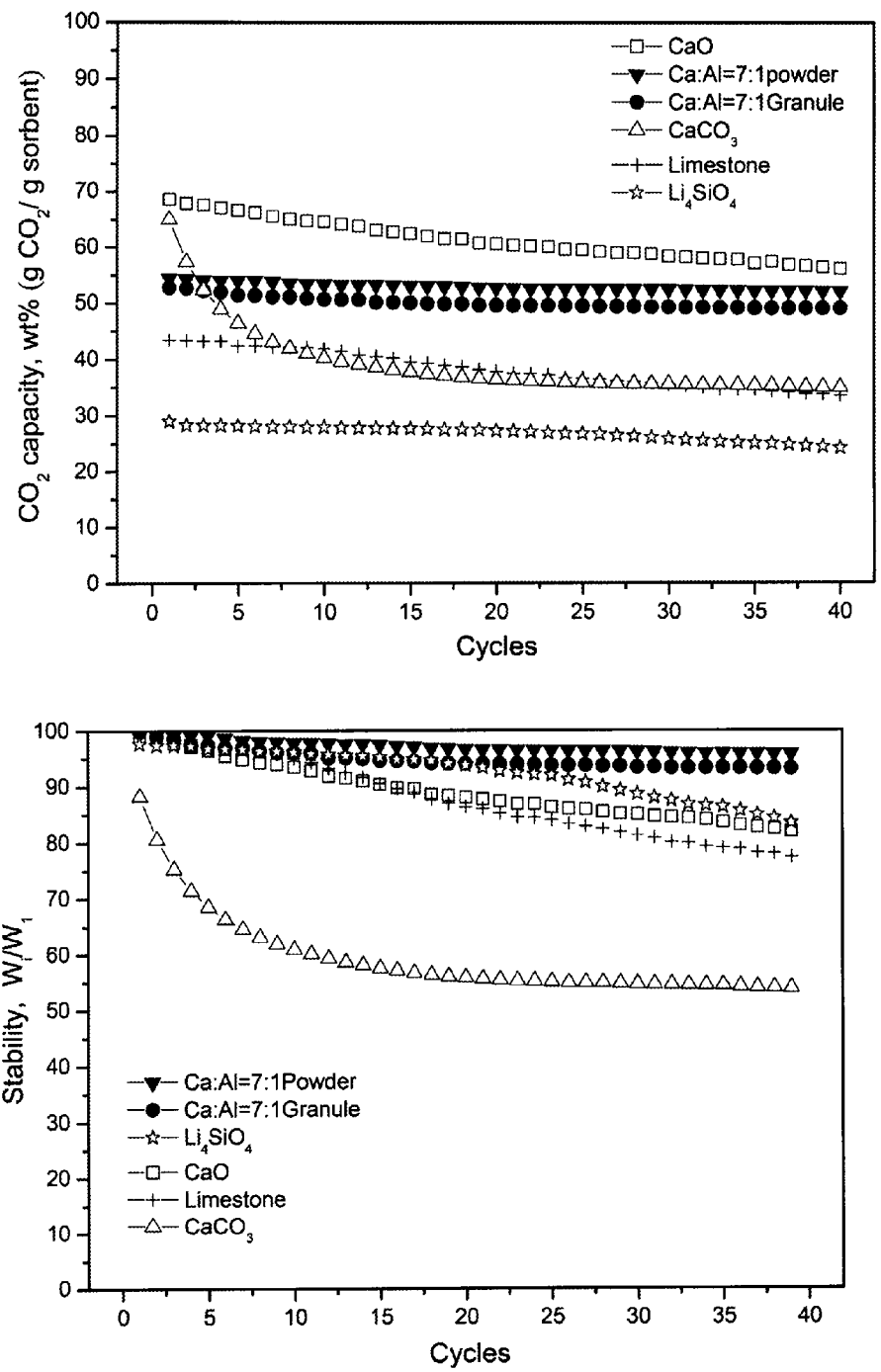
FIG. 10 shows the carbon capturing amount (top) and stability (bottom) of carbon capturing agent with various sorbents, including granules and powders of Ca: Al=7:1, CaO, $CaCO_3$, Limestone and $Li_4SiO_4$ by TGA test upon adsorption/desorption of $CO_2$ at 650~750° C. for 40 cycles.
Figure 11:
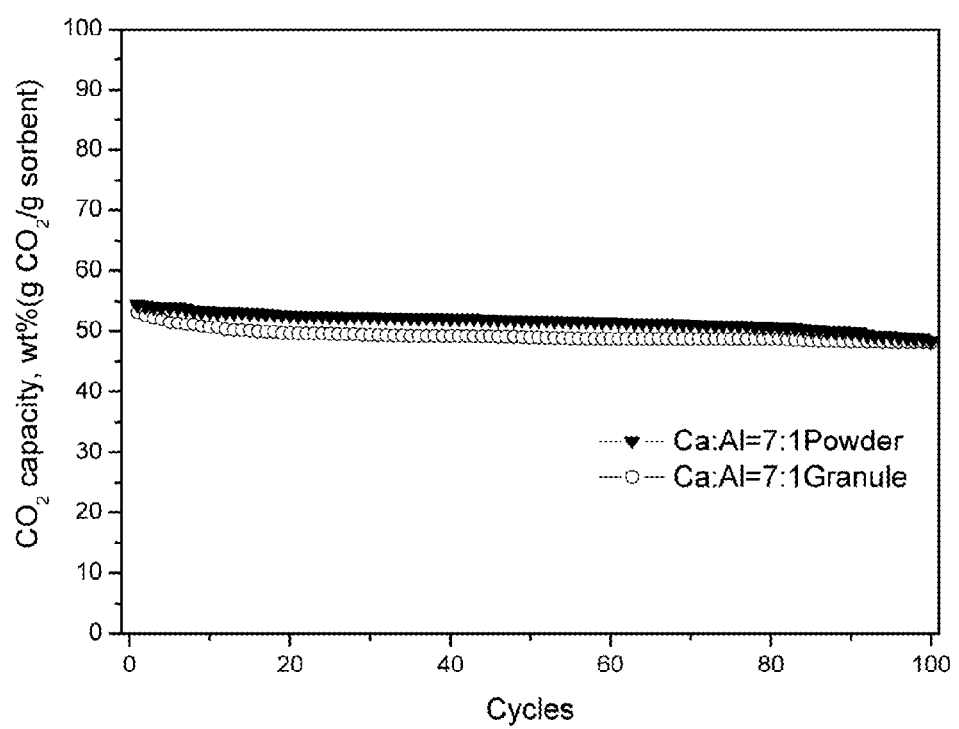
FIG. 11 shows the carbon capturing amount of the carbon capturing agent with granules and powders of Ca: Al=7:1 by TGA test upon adsorption/desorption of $CO_2$ at 750° C. for 100 cycles.

Solid materials used as $CO_2$ sorbents work at different temperature range. For medium-high temperature range at above 600° C., $CO_2$ capturing agents mainly contain CaO, alkaline minerals and lithium silicates. FIG. 10 illustrates that stability of sorbents with granules and powders of Ca: Al=7:1 according to the present invention are compared to CaO, $CaCO_3$, Limestone and $Li_4SiO_4$ in terms of adsorption/desorption of $CO_2$ by TGA test at 650~750° C. for 40 cycles (60 hours). The results show that Ca—Al—$CO_3$ of the invention exhibits $CO_2$ capturing amount of 50-55 wt % and stability of at least 95-98% after 40 cycles. FIG. 11 further indicates that the stability is still as higher than 90% even after 100 cycles. Back to FIG. 10, CaO and $CaCO_3$ has the highest initial sorption weight due to its purity of 95-99%, but the former' stability after 40 cycles is about 85-90% with a continuing decline trend and rapidly reducing to 40-45% for latter, respectively. Limestone and $Li_4SiO_4$ have carbon capturing amount of about 25-45% and stability of about 80% after 40 cycles. It is noticeable that the carbon capturing agent of the present invention, Ca—Al—$CO_3$ has the stability of up to 90% or more even after 40-100 cycles, reaching the highest international standards (85~90%). This invention provides a method of making carbon capturing agent with extremely high stability after 60-150 hours, and significantly higher than the materials such as CaO, $CaCO_3$, Limestone and $Li_4SiO_4$.

The present invention can offer at least the following advantages:

(1) The Ca: Al ratio can be adjusted to at least 1~30 times and yield of $CO_2$ capturing agent is at least of kilograms scale per batch.

(2) The carbon capturing agent absorbs carbon dioxide at temperature of 400 to 800° C.

(3) The captured carbon content increases as Ca: Al ratio increases, and the initial carbon capturing amount can be up to 10~65 wt % (g$CO_2$/g sorbent).

(4) It is applicable to higher than 750° C., and the $CO_2$ concentration range can be up to 5-100% (v/v).

(5) The cycle of $CO_2$ sorption/desorption at 750° C. can be repeated for long time, at least 150 hours, with maintaining the stability to 90%.

In summary, with the use of the method of the present invention, the carbon capturing agent can be produced in batches of kilograms with lower manufacturing cost. This invention can be applied to relevant fixed-bed or fluidized-bed reactors for $CO_2$ capturing verification at medium-high temperature. The important features of the invention include: Ca: Al ratio can be changed up to 1-30 times, the initial carbon capturing amount is 10-65 wt %, and the stability is up to 90% after 40-100 cycles (60-150 hours). In addition, the carbon capturing agent Ca—Al—$CO_3$ of the present invention uses the layered inorganic structure as a template to manufacture the carbon capturing agent with innovative features. It has been quiet about how to produce such a material by existing engineering and manufacturing methods and devices in the world, and also quiet about the applications of such a material to capture $CO_2$ at temperature of at least 600° C. This invention overcomes the shortages in the prior art and thus makes the invention more progressive and more practical in use which complies with the patent law.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A process of manufacturing a carbon capturing agent calcium aluminum carbonate Ca—Al—$CO_3$ operative at moderate/high-temperature, at least comprising the following steps:
    Step of mixing: preparing an acid bath of calcium acetate ($Ca(CH_3COO)_2 \times H_2O$) or calcium chloride ($CaCl_2$) and a solution of aluminum nitrate $Al(NO_3)_3$, and an alkaline bath of sodium carbonate ($Na_2CO_3$) and a solution of sodium hydroxide (NaOH);
    Step of solid-liquid separation: mixing the acid bath with the alkaline bath while stirring to form precipitates which are then subject to solid-liquid separation to obtain a filtrated cake;
    Step of drying and extrusion: placing the filtrated cake into a drying and extrusion device to obtain granular material;
    Step of crushing and conveying: placing the granular material in a conveying and crushing equipment to obtain a powder material; and
    Step of calcined molding: placing the powder material into a high-temperature furnace for calcining, wherein during the calcination, interlayer anions and acetate are removed to form a carbon capturing agent calcium aluminum carbonate (Ca—Al—$CO_3$) of nano-layered composite with high porosity.

2. The process of claim 1, wherein the molar ratio of calcium acetate or chloride and aluminum nitrate $Al(NO_3)_3$ ranges from 1:1 to 30:1.

3. The process of claim 1, wherein at the step of calcined molding, carbon dioxide is captured at the medium-high temperature from 400 to 800° C., with initial captured carbon amount of 10-65 wt %.

4. The process of claim 3, wherein at the step of calcined molding, carbon dioxide is of 5-100% in concentration.

5. The process of claim 3, wherein after the step of calcined molding, stability, defined as a ratio of $CO_2$ sorption weight at i cycles with respect to a $CO_2$ sorption weight at i-1 cycles, is of up to 90% even after 40-100 cycles (60-150 hours).

6. The process of claim 1, wherein the layered composite is a lamella calcium/aluminum carbonate with a structure of anion-containing layered double hydroxides (LDHs).

7. the process of claim 6, wherein the LDHs exhibit two metallic cations of calcium ($Ca^{+2}$) and aluminum ($Al^{+3}$) forming layers of octahedral oxide with interlayer structure of carbonate ($CO_3^{2-}$) and hydroxyl ($OH^-$).

8. The process of claim 1, wherein the granular material is cylindrical and of 2-3 mm in diameter and 3-5 mm in length.

9. The process of claim 1, wherein the powder material is sheet shaped and of aggregate size of 100-200 μm.

* * * * *